US009095151B1

(12) United States Patent
Simon

(10) Patent No.: US 9,095,151 B1
(45) Date of Patent: Aug. 4, 2015

(54) METHOD FOR MAKING TUNA SALAD

(71) Applicant: Mitsui Foods, Inc., Norwood, NJ (US)

(72) Inventor: Frank Simon, Bangkok (TH)

(73) Assignee: MITSUI FOODS, INC., Norwood, NJ (US)

( * ) Notice: Subject to any disclaimer, the term of this patent is extended or adjusted under 35 U.S.C. 154(b) by 0 days.

(21) Appl. No.: 13/763,463

(22) Filed: Feb. 8, 2013

(51) Int. Cl.
| | | |
|---|---|---|
| A23B 4/005 | (2006.01) | |
| A23B 4/07 | (2006.01) | |
| A22C 25/20 | (2006.01) | |
| A23L 3/365 | (2006.01) | |
| A23L 1/326 | (2006.01) | |
| B65B 25/06 | (2006.01) | |
| A22C 25/14 | (2006.01) | |
| A23L 3/10 | (2006.01) | |
| A23L 3/02 | (2006.01) | |

(52) U.S. Cl.
CPC ............ *A23B 4/0056* (2013.01); *A22C 25/145* (2013.01); *A22C 25/20* (2013.01); *A23B 4/005* (2013.01); *A23B 4/07* (2013.01); *A23L 1/326* (2013.01); *A23L 3/365* (2013.01); *B65B 25/062* (2013.01); *A23L 3/02* (2013.01); *A23L 3/10* (2013.01)

(58) Field of Classification Search
CPC ...... A22C 25/14–25/22; A23B 4/005–4/0056; A23B 4/06; A23B 4/07; A23L 1/325; A23L 1/326; A23L 3/02–3/14; A23L 3/36; A23L 3/365; B65B 25/061–25/062; B65B 55/02–55/19
USPC ......... 426/129, 131, 643, 393, 397, 399, 401, 426/407, 412, 520–521, 524, 518, 410
See application file for complete search history.

(56) References Cited

U.S. PATENT DOCUMENTS

| | | | | |
|---|---|---|---|---|
| 2,373,988 | A * | 4/1945 | Wuori et al. ................. | 426/407 |
| 2,806,795 | A * | 9/1957 | Iki ................................ | 426/92 |
| 3,594,196 | A * | 7/1971 | Peterson ...................... | 426/523 |
| 3,959,505 | A * | 5/1976 | Valiant, II .................... | 426/393 |
| 4,363,820 | A * | 12/1982 | Ernster ......................... | 426/257 |
| 5,863,578 | A * | 1/1999 | Guarino ....................... | 426/113 |
| 6,099,884 | A * | 8/2000 | Manfre ......................... | 426/510 |
| 2002/0012724 | A1* | 1/2002 | Kowalski ..................... | 426/129 |
| 2009/0297672 | A1* | 12/2009 | Warne .......................... | 426/106 |
| 2010/0294783 | A1* | 11/2010 | Ronsin et al. ................ | 220/660 |

FOREIGN PATENT DOCUMENTS

| | | | | |
|---|---|---|---|---|
| JP | 05-227878 | * | 9/1993 | ............... A23B 4/00 |
| KR | 20040042558 | A * | 5/2004 | |
| PH | 26539 | A * | 8/1992 | |

OTHER PUBLICATIONS

"StarKist" ("Frequently Asked Questions"), pub. Oct. 12, 2010. http://web.archive.org/web/20101012025111/http://www.starkist.com/faq.*
FAO ("Canning/Sterilization of Meat Products"), pub. May 13, 2010. http://web.archive.org/web/20100513165135/http://www.fao.org/docrep/010/ai407e/A1407E22.htm.*
"Epicurious" (Tuna Red Onion and Parsley Salad), pub. 2004. http://www.epicurious.com/recipes/food/views/Tuna-Red-Onion-and-Parsley-Salad-109577.*
"Polynova" ("Retort Pouches"), pub. Sep. 1, 2010. http://web.archive.org/web/20100901104035/http://www.polynova.com/barrier-pouch-types/retort-pouches.html.*
"ATI" ("Products"), pub. Nov. 20, 2008. http://web.archive.org/web/20081120184036/http://www.tunaindonesia.com/products.php.*
Peterson ("Heat Transfer Variables Affecting Process Determinations in Conduction Heating Institutional Size Retort Pouches"), Chapter 2—Literature Review. Dissertation, University of Florida, 1984. http://archive.org/details/heattransfervari00pete.*
Garthwaite ("The Frozen Fish Chain"), Seafish, pub. 1986. http://www.seafish.org/media/Publications/TheFrozenFishChain_OLMod.pdf.*
"eHow" ("How to Freeze Canned Tuna"), pub. Sep. 5, 2010. http://web.archive.org/web/20100905081657/http://www.ehow.com/how_6544404_freeze-canned-tuna.html.*
"FDA" ("Part 161—Fish and Shellfish", Title 21—Food and Drugs, Chapter 1—Food and Drug Administration, Department of Health and Human Services, Subchapter B—Food for human consumption, vol. 2), pub. Jan. 5, 2009. http://web.archive.org/web/20090105000502/http://www.accessdata.fda.gov/scripts/cdrh/cfdocs/cfcfr/CFRSearch.cfm?fr=161.190.*
"Wild Planet" ("Healthy Recipes Using Tuna"), pub. online Dec. 5, 2010. http://web.archive.org/web/20101205123426/http://www.wildplanetfoods.com/Healthy-Recipes.html.*
"freshCUT" ("Cold Chain Begins Before Processing Starts"), pub. Sep. 24, 2007. http://freshcut.com/index.php/magazine/article/Cold-Chain-Begins-Before-Processing-Starts.*
"AVA" ("Benefits of Chilled and Frozen Meat"), pub. Oct. 7, 2008. http://web.archive.org/web/20081007083802/http://www.ava.gov.sg/FoodSector/FoodSafetyEducation/Food+Facts/BenefitsChilledMeat/.*
Feidi ("Importance of Cold Chain to the Fish Industry"), Arab World Agribusiness, vol. 28, No. 6, pub. 2012, pp. 11-13. http://www.fanar-publishing.com/Editions/AWA/AWA%202012/AWA%2028-6/AWA%2028-6%20Eng.pdf.*

* cited by examiner

*Primary Examiner* — Drew Becker
(74) *Attorney, Agent, or Firm* — Drinker Biddle & Reath LLP

(57) ABSTRACT

A method of making tuna salad with improved storage and organoleptic properties by retorting precooked tuna to an internal temperature of at least 100° C. for at least one minute, cooling the retorted tuna and combining the retorted with other appropriate ingredients for making tuna salad while maintaining the tuna and other ingredients at a temperature of −1° C. to 4.4° C.

8 Claims, No Drawings

METHOD FOR MAKING TUNA SALAD

FIELD

This invention pertains to tuna processing and, more particularly, to improved methods for making tuna salad.

BACKGROUND

Currently, commercial manufacturers of bulk tuna salad acquire tuna in large cans or vacuum pouches which have been subjected to retorting or "sterilizing" to kill vegetative pathogenic spores at the center of the package so that the tuna will be safe to use when the cans or pouches are opened and used in making tuna salad in facilities maintained at room temperature. The retorting may be carried out, for example, by placing precooked tuna loin in sealed 10"×15" pouches or cans and heating for about 97 minutes or more at temperatures of about 121° C. or more. Such relatively aggressive retorting processes have been thought to be necessary to ensure that the product will be stable at room temperature until the cans or pouches are ultimately opened and the tuna is either eaten or added to other ingredients to make dishes like tuna salad. However, heating at such elevated temperatures for such extended periods degrades the organoleptic properties of the tuna making it dry and hurting its appearance so that the tuna itself and dishes made from it are adversely affected. This is of particular concern with respect to commercially made bulk tuna salad which must be as appealing as possible to satisfy customers like restaurants and individual consumers.

The prior art may also generally discuss cooking precooked tuna loins or shellfish at temperatures in the range of about 80-110° C. for varying cooking times in attempts to improve storage characteristics. However, such prior art techniques which do not employ the relatively aggressive retorting processes referenced above are not considered effective in making can or pouch stored tuna safe for consumption without additional processing to kill vegetative pathogenic spores.

The prior art thus does not teach or suggest the present methods in which the tuna cans or pouches are subjected to an abbreviated or gentler sterilizing step, and then chilled or frozen, and used in making tuna salad. In this new method, the tuna and other tuna salad ingredients are maintained in a chilled condition during the preparation of the tuna salad and the final tuna salad product is kept in a chilled condition until presented for eating. This method is more efficient and economical than prior art methods and produces a superior tuna salad product. It makes it possible to substantially reduce heating or retort time and to improve the organoleptic properties of the tuna salad end product while maintaining good shelf life.

SUMMARY

Embodiments of the invention comprise methods of making tuna salad. According to embodiments, raw tuna is thawed, eviscerated, racked by size, precooked, cooled, cleaned, and stored in cans or pouches before retorting. The precooking is preferably carried out to produce a tuna backbone temperature of at least 57° C. It is preferred that the precooked tuna is rapidly cooled, cleaned and packed into plastic pouches before gently retorting it as described below.

The precooked tuna next is gently retorted to produce an internal tuna temperature of at least 100° C. for at least one minute. This constitutes an abbreviated sterilizing step. Preferably, this gentle retorting is carried out for about 77 minutes at about 120° C. for 10"×15" plastic pouches with 3 kg tuna fill.

After gently retorting the tuna in the abbreviated sterilizing step, it is chilled. Preferably, the tuna is chilled until it reaches an internal temperature of at least about −1° C. or lower. The chilled, retorted tuna (which may be frozen for storage and then thawed before use) then is combined with other appropriate ingredients for making tuna salad while maintaining the tuna and other ingredients in a chilled condition.

Surprisingly, it has been found that tuna which is subjected to the abbreviated sterilizing step described above, chilled or frozen, and then maintained and used in accordance with the invention in making tuna salad produces a final tuna salad product in which the tuna has improved organoleptic properties and shelf life. In order to maintain the improved organoleptic properties and insure the improved shelf life, the tuna and other salad ingredients are maintained in a chilled condition during preparation of the tuna salad and the tuna salad is kept in a chilled condition until presented for eating. The abbreviated sterilizing step is both responsible for these improved properties and also makes the overall process more energy-efficient and economical.

DETAILED DESCRIPTION

Precooking

The starting material in the practice of the method of this invention is precooked lightmeat tuna which is prepared from frozen raw tuna that is thawed, eviscerated, racked by size, precooked, cooled, and cleaned. The precooking of the tuna preferably will be sufficient to produce a backbone temperature of at least 57° C. or higher. When we refer to "lightmeat tuna" we intend to include all of the tuna used for human food, including albacore tuna which may be referred to as "whitemeat" tuna.

Following precooking, the tuna heads, tails, skin, bones and redmeat are removed leaving lightmeat tuna loins for subsequent treatment. The precooked lightmeat tuna loins can be reduced to any appropriate size to facilitate filling cans or pouches, heating and final mixing in tuna salad. The lightmeat may be flaked to facilitate filling pouches or chunked and cut to can height for solid packs or cans. Preferably, the lightmeat will be flaked to a size of about 0.5 inches by 0.25 inches before being placed in the pouches before the abbreviated sterilizing (or gentle retorting) step. In the filling step, oil and/or a vegetable broth may be added to help maintain the moisture in the tuna.

Retorting and Chilling

The precooked tuna (with or without oil and/or a vegetable broth) is gently retorted in a conventional pressurized steam retort apparatus (for canned tuna) or in water spray retort (for pouch tuna). The gentle retorting should be carried out at a temperature and time sufficient to produce an internal tuna temperature of at least 100° C. or higher for at least one minute.

Preferably, the abbreviated sterilization step will be carried out for about 77 minutes at about +120° C. for 10"×15" plastic pouches with 3 kg tuna fill, and following this gentle retorting the tuna will be cooled to at least 4.4° C. or lower and for pouch tuna preferably frozen. Indeed, it is yet more preferred that the pouch tuna be blast-frozen following retorting and, for both pouch and canned tuna, it is preferred that the cans and pouches be cooled within one hour of the completion of retorting, and more preferably immediately following retorting.

In the case of pouch tuna, it is preferred that the gently retorted tuna be promptly moved to a blast freezer for cooling following the completion of the retorting. When the pouch tuna is treated in this way it will be blast-frozen at about −20° C. or lower. Preferably, it will be blast-frozen at about −50° C. When a water spray retort is used with pouched tuna it typically will automatically cool the pouch down to 38° C. In this case, the cooled pouches should be loaded into an airblast or plate freezer within 3 hours and frozen to −20° C. in about 4 hours. The tuna will then be maintained at −20° C. throughout distribution. Prior to use, the temperature of the pouches will be raised to between −1° C. and +4.4° C.

Preparation of Tuna Salad

The frozen, retorted tuna cans and pouches may be used in making tuna salad. The salad maker will thaw the tuna to a temperature of −1° C. to +4.4° C. as described earlier.

Once thawed while being held to a temperature of −1° C. to +4.4° C., the tuna will be combined with other appropriate ingredients (salad dressing, spices and flavors, etc.) for making tuna salad while being maintained in a working environment also maintained in this temperature range and mixed using conventional mixing techniques to provide a final tuna salad product. It is important that the tuna salad itself be kept at a temperature of −1° C. to +4.4° C. or lower until it is served to maintain the properties of the tuna. If kept in this temperature range, the tuna salad will be safe and organoleptically desirable for at least 14 days before there is any danger of spoilage.

The following examples are intended to be illustrative of embodiments of the present invention and to teach one of ordinary skill how to make and use embodiments of the invention. These examples are not intended to limit the invention or its protection in any way.

EXAMPLES

Example 1

Preparation of Tuna Using Abbreviated Sterilizing Process

1. First, caught tuna is precooked to produce a backbone temperature of 57° C. Then, the precooked tuna heads, tails, skin, bones and redmeat are removed leaving lightmeat tuna. This lightmeat tuna is flaked to a generally uniform size of about 0.5 inches by 0.25 inches and then placed in pouches suitable for retorting along with vegetable broth.

2. When the tuna is ready to be subjected to an abbreviated sterilization process, it is placed in a pressurized steam retort maintained at 121° C. for 77 minutes to produce an internal tuna temperature of 105° C.

3. The retorted pouches are then cooled and moved into a blast freezer maintained at about −50° C. within 3 hours and promptly frozen and maintained in a frozen state.

Example 2

Preparation of Tuna Salad

The frozen retorted tuna pouches prepared in Example 1 are thawed at a temperature of 4.4° C. Once thawed, the flaked tuna is removed from the pouches and combined with other appropriate ingredients for making tuna salad in a working environment maintained at 4.0° C. This combination is mixed using conventional mixing techniques to provide a final tuna salad product.

If the resulting tuna salad is maintained at a temperature of −1° to 4.4° C. it will still be organoleptically desirable and safe to use for at least two weeks. Furthermore, it will have improved appearance, moistness and flavor as compared to tuna salad prepared from tuna subjected to conventional retorting.

The use of the terms "a" and "an" and "the" and similar referents in the context of describing embodiments of the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. It should be understood that the illustrated embodiments are exemplary only, and should not be taken as limiting the scope of the invention. No language in the specification should be construed as indicating any non-claimed element as essential to the practice of the invention.

What is claimed is:

1. A method of making tuna salad comprising:
providing lightmeat tuna prepared from frozen raw tuna that has been thawed, eviscerated, and precooked to produce a backbone temperature of at least 57° C., cooled and cleaned;
storing the lightmeat tuna in cans or pouches with or without oil and/or a vegetable broth;
retorting the lightmeat tuna at a temperature of about 120° C. for about 77 minutes to produce an internal tuna temperature of at least 100° C. for at least one minute;
cooling the retorted tuna in cans or pouches to 4.4° C. or less; and
combining the cooled retorted tuna with other appropriate ingredients for making tuna salad while maintaining the retorted tuna and other ingredients at a temperature of −1° C. to 4.4° C. until served.

2. The method of claim 1 in which a 3 kg fill of lightmeat tuna is placed in 10"×15" plastic pouches for retorting.

3. The method of claim 2 in which the pouches are blast frozen during the cooling step to about −20° C. or lower.

4. The method of claim 1 in which the tuna is maintained at about −20° C. until it is to be used in making tuna salad and then warmed to between −1° C. and 4.4° C.

5. The method of claim 4 in which the tuna salad is maintained at a temperature of −1° C. to 4.4° C. until it is served.

6. The method of claim 1 in which the retorted tuna is stored in cans or pouches with or without oil and/or a vegetable broth.

7. The method of claim 1 in which the retorted tuna is stored in pouches or cans and the lightmeat is flaked before being placed in the pouches or cans.

8. A method of making tuna salad comprising:
providing lightmeat tuna prepared from frozen raw tuna that has been thawed, eviscerated, and precooked to produce a backbone temperature of at least 57° C., cooled and cleaned;
storing the lightmeat tuna in cans or pouches with or without oil and/or a vegetable broth;

retorting the lightmeat tuna at a temperature of about 120° C. for about 77 minutes to produce an internal tuna temperature of at least 100° C. for at least one minute;

cooling the retorted tuna in cans or pouches to 4.4° C. or less; and combining the chilled retorted tuna with other appropriate ingredients for making tuna salad while maintaining the retorted tuna and other ingredients at a temperature of −1° C. to +4.4° C.; and maintaining the tuna salad at a temperature of −1° C. to 4.4° C. until it is served.

* * * * *